United States Patent
Lin et al.

(10) Patent No.: US 8,818,948 B2
(45) Date of Patent: Aug. 26, 2014

(54) DYNAMIC DISK REDISTRIBUTION

(75) Inventors: Kung Lin, Irvine, CA (US); Donald Hart, Foothill Ranch, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 13/298,394

(22) Filed: Nov. 17, 2011

(65) Prior Publication Data

US 2012/0265731 A1 Oct. 18, 2012

Related U.S. Application Data

(60) Provisional application No. 61/472,471, filed on Apr. 6, 2011.

(51) Int. Cl.
  *G06F 7/00* (2006.01)
  *G06F 17/00* (2006.01)
  *G06F 17/30* (2006.01)

(52) U.S. Cl.
  CPC .............................. *G06F 17/30584* (2013.01)
  USPC ............ 707/636; 707/637; 707/638; 707/640

(58) Field of Classification Search
  CPC ............................................... G06F 17/30584
  USPC ........... 707/1, 627, 659, 737; 718/1; 709/221; 705/41
  See application file for complete search history.

(56) References Cited

U.S. PATENT DOCUMENTS

| | | | |
|---|---|---|---|
| 7,461,103 B2 * | 12/2008 | Aronoff et al. | 1/1 |
| 8,150,811 B1 * | 4/2012 | Tarenskeen et al. | 707/659 |
| 2003/0144990 A1 * | 7/2003 | Benelisha et al. | 707/1 |
| 2010/0106813 A1 * | 4/2010 | Voutilainen et al. | 709/221 |
| 2011/0083130 A1 * | 4/2011 | Boldyrev et al. | 718/1 |
| 2012/0011062 A1 * | 1/2012 | Baker et al. | 705/41 |
| 2012/0254111 A1 * | 10/2012 | Carmichael | 707/627 |
| 2012/0254175 A1 * | 10/2012 | Horowitz et al. | 707/737 |

* cited by examiner

*Primary Examiner* — Susan Chen (74) *Attorney, Agent, or Firm* — James E. Goepel (57) ABSTRACT

Methods and systems are disclosed to perform dynamic disk data redistribution in a database environment. The methods and systems disclosed herein provide for the transparent redistribution of data across multiple physical disks of a database while maintaining accessibility to the database. Methods and systems are also disclosed for handling requests to perform database operations on data that is in the process of being redistributed.

9 Claims, 5 Drawing Sheets

DYNAMIC DISK REDISTRIBUTION

CROSS REFERENCE TO RELATED APPLICATIONS

The present application claims priority to U.S. Provisional Patent Application No. 61/472,471, dated Apr. 6, 2011, the disclosure of which is hereby incorporated by reference in its entirety.

TECHNICAL FIELD

The present disclosure relates generally to distributing data across multiple physical productions disks in a database system; in particular, the present disclosure relates to performing dynamic disk redistribution without taking a database system offline.

BACKGROUND

In a database environment, multiple physical production disks or other storage devices are typically used to store database data within a single logical database. Often data is added to these physical disks in an uneven manner, such that one or more of the physical disks contain more data than the other physical disks. This can occur for a number of reasons. For example, although a database management system typically stores data evenly across a set of storage devices, when those devices approach capacity, new physical devices are often added to the array of storage devices. Subsequent storage operations continue to distribute data evenly across the devices, with the result that any newly added devices remain at a consistently lower usage than devices which have been a part of the logical database for a longer amount of time (i.e., more storage operations).

To ensure best performance, it can be desirable to spread that data evenly across the physical disks (i.e., to distribute read/write requests across the disks). However, current methods for redistributing data evenly across multiple disks take the database offline to perform the redistribution. This is to alleviate the issue of data in a database file changing between the time it is copied from a first physical disk to when it is written to the second, or target, physical disk to which that data is redistributed. Taking the database offline for redistribution leaves users without the ability to read data from or write data to the database during the time the database is offline.

For these and other reasons, improvements are desirable. Although specific problems have been addressed in this Background, this disclosure is not intended in any way to be limited to solving those specific problems.

SUMMARY

In accordance with the following disclosure, the above and other issues are addressed by the following:

Generally, embodiments of the present disclosure provide systems and methods in which a database can balance data across one or more physical disks by performing dynamic data redistribution without taking a database system offline. In such embodiments, the data redistribution is performed in a manner that is transparent to users of the database, thereby allowing users continued access to perform operations on the data stored in the database.

In further embodiments, systems and methods are disclosed to perform database operations, such as I/O operations, during dynamic disk data redistribution. In such embodiments, the methods and systems described herein provide additional mechanisms for handling I/O requests that target data that may reside in multiple places.

In one aspect, a method for performing dynamic disk redistribution while maintaining a user's ability to access to a database is disclosed. The method includes initializing a temporary file, and copying a live database file from a first memory device to the temporary file, wherein the temporary file comprises redistributed data. The method further includes swapping the live database file with the temporary file, and purging the live database file.

In a second aspect, a computer storage medium is disclosed. The computer storage medium encodes computer executable instructions that, when executed by at least on processor, perform a method of dynamic disk redistribution. The method includes receiving a redistribute command, and initializing a temporary file. The method further includes copying live database file to the temporary file, wherein the temporary file comprises redistributed data. The method also includes writing the temporary file to the database, including distributing data from the temporary file evenly over one or more physical disks that make up the database, and purging the live database files.

In a third aspect, a system for performing dynamic disk redistribution while maintaining a user's ability to access to a database is disclosed. The system includes at least one processing unit and a memory. The memory stores computer executable instructions that, when executed by the at least one processing unit, perform a method of receiving a redistribute command, initializing a temporary file, and copying live database file to the temporary file, wherein the temporary file comprises redistributed data. The method further includes receiving an I/O operation, determining if a target of the I/O operation is located in the temporary file, and, if the target of the I/O operation is located in the temporary file, performing the I/O operation on the temporary file and the live database file. The method further includes writing the temporary file to the database, wherein writing the temporary file comprises distributing data from the temporary file evenly over one or more physical disks that make up the database. The method also includes purging the live database files.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In embodiments, a database environment may include multiple physical (or production) disks that are linked together using a logical name that represents the database. Data added to the database is stored on the multiple physical disks. In embodiments, data may consist of files, electronic documents, objects, relational tables, or any other type of information capable of being stored in a database system. As data is added to the database, the data is spread across the multiple physical disks. Eventually, the amount of free space in the physical disks runs out and new physical disks are added to the database. In this scenario, the database may comprise physical disks that are nearly at storage capacity (e.g., the old physical disks) and other physical disks that are nearly devoid of any actual data.

In embodiments, data written to the database is stored on the physical disks in a round robin manner. That is, a first data entry is written to the first physical disk, the second data entry is written to the second physical disk, and so on until the last physical disk is reached, at which point the next data entry will again be written to the first physical disk. However, as previously described, when new physical disks are added to the database, the data is distributed unevenly among the physical disks (e.g., older disks having more data, newer disks having less). In embodiments in which the data is distributed in a round robin fashion, the older disks will reach capacity. In order to avoid this problem, the data stored in the database may be redistributed in a balanced fashion across all of the disks. In the past, it was necessary to take the database offline while performing data redistribution. Embodiments of the present disclosure provide systems and methods in which a database can balance data across one or more physical disks by performing dynamic data redistribution without taking the database system offline. In such embodiments, the data redistribution is performed in a manner that is transparent to users of the database, thereby allowing users continued access to perform operations on the data stored in the database.

Figure 1:
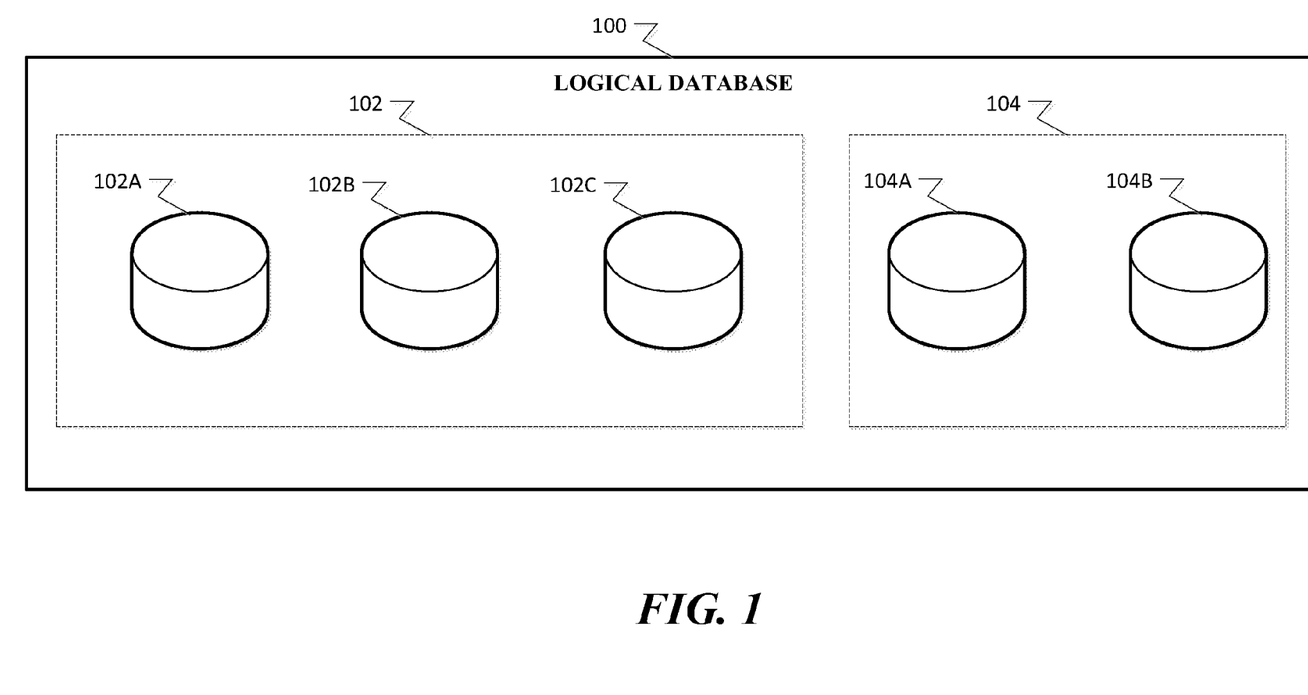
FIG. 1 is a block diagram illustrating an example embodiment of a system environment for performing dynamic disk redistribution.

FIG. 1 is a block diagram illustrating an example embodiment of a system environment for performing dynamic disk redistribution. The system includes a database 100. In embodiments, a database may consist of multiple physical (or production) storage devices (e.g., disks). These different physical disks are virtually linked together via a logical identifier or name which identifies the database 100. Although only a specific number of physical disks are shown in FIG. 1, any number of physical disks may be linked together in a database environment.

In the embodiment illustrated in FIG. 1, the database 100 contains live physical disks. Three of the physical disks, discs 102A, 102B, and 102C may be the "original" disks that were a part of database 100, as indicated by pox 102. By "original," it is understood that the disks 102A, 102B, and 102C were associated with database 100 at an earlier point in time. In embodiments, as data is added to the database 100, the data may be added in a round robin fashion across disks 102A, 102B, and 102C. At some point, disks 102A, 102B, and 102C may reach or near their storage capacity. In order to provide more storage capacity for database 100, "new" disks 104A and 104B may be associated with database 100. New disks 104A and 104B are indicated by box 104. By new, it is understood that physical disks 104A and 104B were added or logically associated with database 100 at a point later in time than disks 102A, 102B, and 102C.

After adding new disks 104A and 104B to database 100, the original disks 102A, 102B, and 102C contain all of the information of the database 100 (e.g., the live database files) while new disks 104A and 104B do not contain any database information. For example, original disks 102A, 102B, and 102C may each contain 30 files, while new disks 104A and 104B contain 0 files. In embodiments new disks 104A and 104B will be added to the round robin distribution whenever new data is added to the database 100. However, original disks 102A, 102B, and 102C will also receive new data. For example, if 5 files are added to the database in the round robin fashion, original disks 102A, 102B, and 102C would each have stored a total of 31 files while new disks 104A and 104B would only have a total of 1 file stored on each. This leads to a situation in which the data is not evenly distributed among all of the physical disks of database 100 (which now consists of five physical disks 102A, 102B, 102C, 104A, and 104C). Ideally, the data would be distributed evenly across all of the physical disks that make up database 100 (e.g., 19 files equally distributed across physical disks 102A, 102B, 102C, 104A, and 104C). In order to balance the disks, that is, evenly distribute the data across all disks of the database 100, database 100 must perform a disk data redistribution operation in which data from original disks 102A, 102B, and 102C is distributed evenly among all of the physical disks in database 100.

In the past, performing data redistribution required an administrator to take the database 100 offline in order to avoid any inconsistencies that may occur as users manipulate the database's data while the data is being moved around. Embodiments of the present disclosure provide systems and methods that perform dynamic disk data redistribution. In embodiments, data redistribution is performed in a manner that is transparent to users of a database, such as database 100 of FIG. 1. In such embodiments, data can be evenly balanced across all physical disks of the database without interrupting a user's ability to access or manipulate data in the database. In embodiments, a user may be any person, application, or process that attempts to access or manipulate the database by issuing an input/output ("I/O") requests to the database. I/O requests may be a read command to read data from the database, a write command to write data to the database, a create command to create new data within the database, a delete command to delete data from the database, or any other type of command that is performed on a database or in a database environment such as the example embodiment of a system environment provided in FIG. 2.

Figure 2:
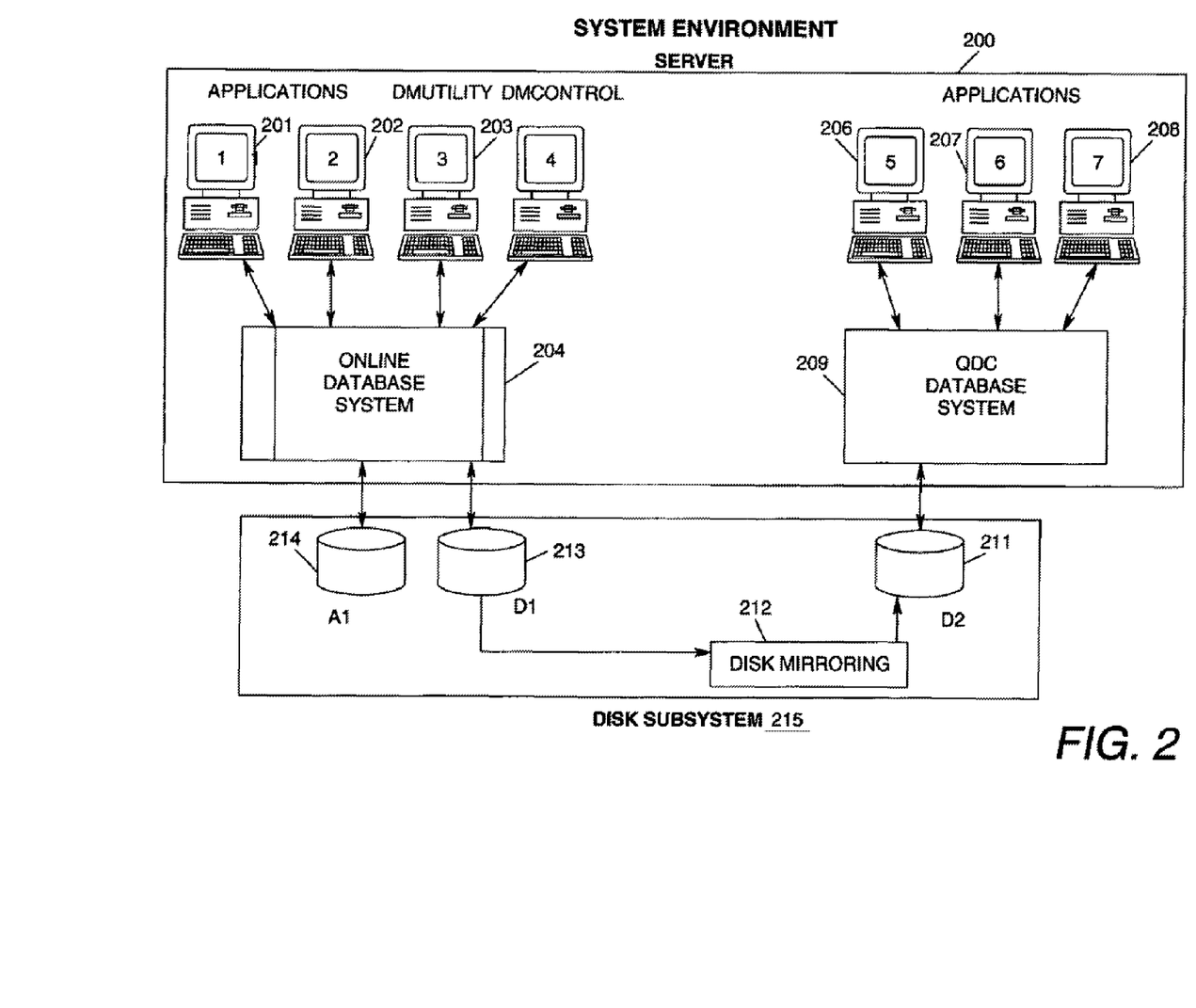
FIG. 2 is a drawing of an embodiment of a system environment showing a server connected to a disk subsystem.

FIG. 2 is an illustration of an embodiment of a system environment. A server 200 is used to run several different applications and utilizes the personal computer client-users 201, 202, and 203, which interact with and access the database system 204 within the single server 200. The server also utilizes the PC client-users 206, 205 and 208, which interact with and access the QDC database system 205 within the server 200.

Within the disk subsystem 215, the data files contained in disk 213 (D1) are communicated back and forth with the primary online database system 204, and also sent via the disk mirroring system 212 to disk (D2), 211. Disk (D2) 211 contains the mirrored database snapshot.

The data files of database system 204 are mirrored via system 212 and communicated to the secondary QDC database system 205.

Figure 3:
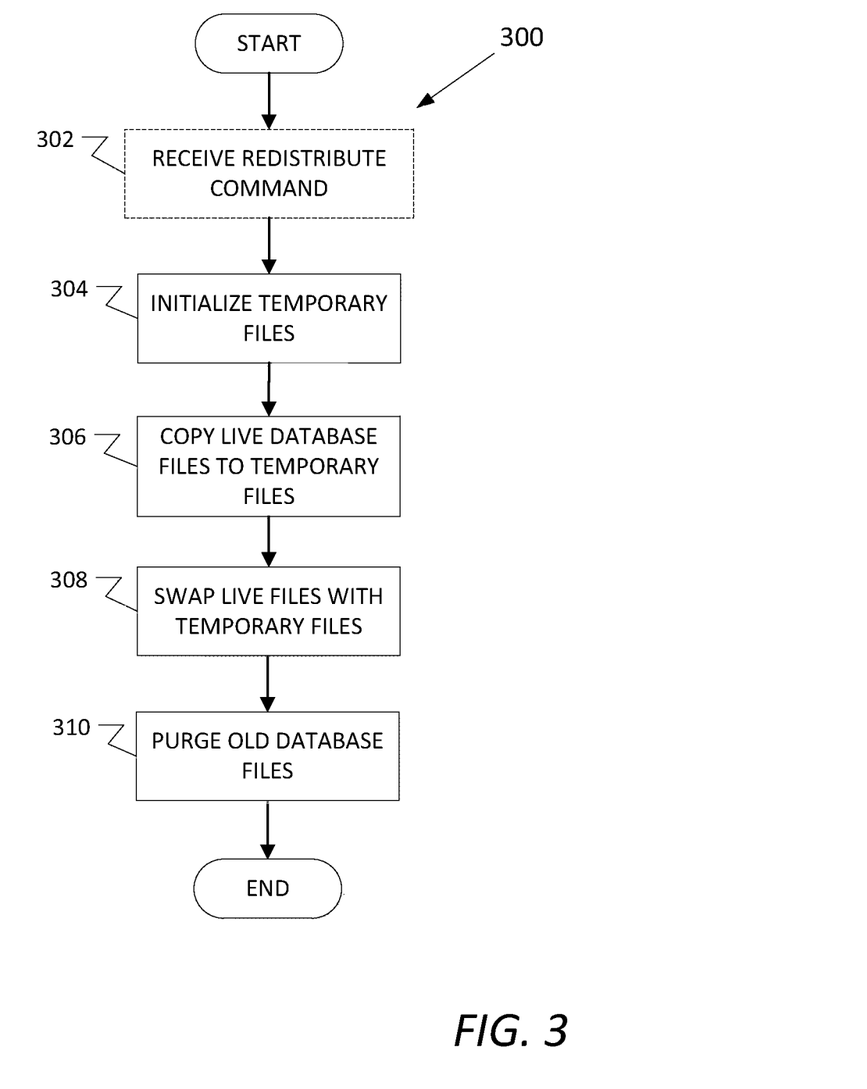
FIG. 3 is a flow diagram illustrating an embodiment of a method for performing dynamic disk redistribution.

FIG. 3 is a flow diagram illustrating an embodiment of a method for performing dynamic disk redistribution. In embodiments, the method 300 may be performed by a database system, such as the database system 100, that may include one or more computing devices, such as the computing device described with respect to FIG. 5. In other embodiments, the method 300 may be performed by a standard computing device. Furthermore, the method may be performed in software, hardware, or a combination of both software and hardware.

Flow begins at optional operation 302 where a redistribute command is received. For example, a database administrator, upon adding new physical disks to a database environment, may issue a command to the database system to redistribute database data across the databases physical disks in order to balance the data across the multiple physical disks. In embodiments, the redistribute command may apply to all data that resides in the database. In another embodiment, the redistribute command may target one or more specific files (e.g., specific data targets) for redistribution. In embodiments, operation 302 is optional because a database system may automatically perform the dynamic disk redistribution without having to receive a redistribute command. For example, a database system may automatically redistribute data upon the addition of new physical disks to the database. In another embodiment, a database or computer performing the method 300 may redistribute data according to a preset schedule. In still further embodiments, the dynamic data redistribution may be triggered by an event, for example, one or more physical disks nearing capacity.

Flow proceeds to operation 304, where one or more temporary files are initialized. The one or more temporary files may be used to store database data (e.g., files, tables, objects, etc.) during redistribution. In embodiments, the one or more temporary files contain the same attributes as the data that is to be redistributed (e.g., the redistributed data). For example, the one or more temporary files may have all of the same physical attributes (e.g., disk attributes) as the redistributed data. In other embodiments, the temporary files may also have all of the same logical attributes as the redistributed data.

Flow continues to operation 306 where one or more live database files (e.g., database files that contain data that currently resides in the database) are copied into the one or more temporary files. In embodiments, the live database files contain the data that is to be redistributed across the one or more physical disks of the database. In embodiments, one or more different workers may be employed to copy the data from the one or more live database files to the one or more temporary files. A worker may be a task, a process, an application, etc. that is capable of copying data from the live database files into the temporary files. In embodiments, these workers may concurrently execute to copy data from the one or more live database files to the one or more temporary files. Because a large amount of data may reside in the live database files, utilizing multiple workers to concurrently copy data from the one or more live database files may greatly reduce the amount of time necessary to perform the dynamic data redistribution.

In an embodiment, the number of workers employed to copy data at operation 306 may be a selectable option. For example, a user issuing a redistribute command may provide a parameter with the command that indicates the number of workers that should be instantiated to perform the copy task.

In another embodiment, the amount of workers may be dynamically determined based upon the number of available resources, the amount of data to be redistributed, by the amount of time allotted to perform the redistribution, or by any other means of dynamically allocating resources for performing tasks known to the art.

Upon copying the one or more live database files to the one or more temporary files, flow continues to operation 308. At operation 308, the live files in the database are swapped with the redistributed data that was copied into the one or more temporary files at operation 306. In embodiments, the redistributed data located in the temporary files is written to the one or more physical disks in a manner such that the data is evenly distributed across the one or more physical disks. For example, the data from the temporary file may be written to the one or more physical disks in a round robin manner to ensure that the redistributed data is spread evenly across the one or more physical disks of the database. In further embodiments, a number of workers (e.g., processes, applications, threads, etc.) may also be employed at operation 308 to write data to the database.

In embodiments, a user's access to the database may be temporarily suspended during operation 308. However, in embodiments the user's access may be suspended in a manner that is not transparent to the user. For example, the user may still be able to issue requests (e.g., I/O requests) to the database during operation 308; however, the requests may be placed in a queue to be performed after operation 308 completes. In such embodiment, though the user's access to the database may be suspended, the user still appears to have access to the database because the database is still online and the user can still submit requests to the database.

Flow continues to operation 310, in which the old database files (e.g., the live database files copied into the temporary files at operation 306) is purged from the database. Because the redistributed data was written to the database in a balanced manner at operation 308, once the old database files are purged from the database, the redistributed data will be evenly distributed across the one or more physical disks of the database. The temporary files used to store the redistributed data may also be purged at operation 310.

While FIG. 3 describes the method 300 by illustrating a discreet number of operations performed in a particular order, one of skill in the art will appreciate that additional or fewer operations may be employed in further embodiments to perform dynamic disk data redistribution. For example, the two of the operations described with respect to FIG. 3 may be combined into a single operation without departing from the spirit of the embodiments disclosed herein. Furthermore, while the operations 302-310 are described in a particular order, one of skill in the art will appreciate that the method 300 may be performed without adhering to the order described with respect to the particular embodiment illustrated in FIG. 3. For example, the copy operation 306 and the swap operation 308 may be performed concurrently without departing from the spirit of the embodiments disclosed herein.

The method 300 may be performed as a background task to redistribute data across the physical disks without requiring that the database is taken offline, thereby allowing users (e.g., database administrators, applications, etc.) to access the database and perform operations on the data while the redistribution is being performed. In order to allow continued access and manipulation, a database performing dynamic disk data redistribution may provide additional functionality to handle I/O requests that target redistributed data.

Figure 4:
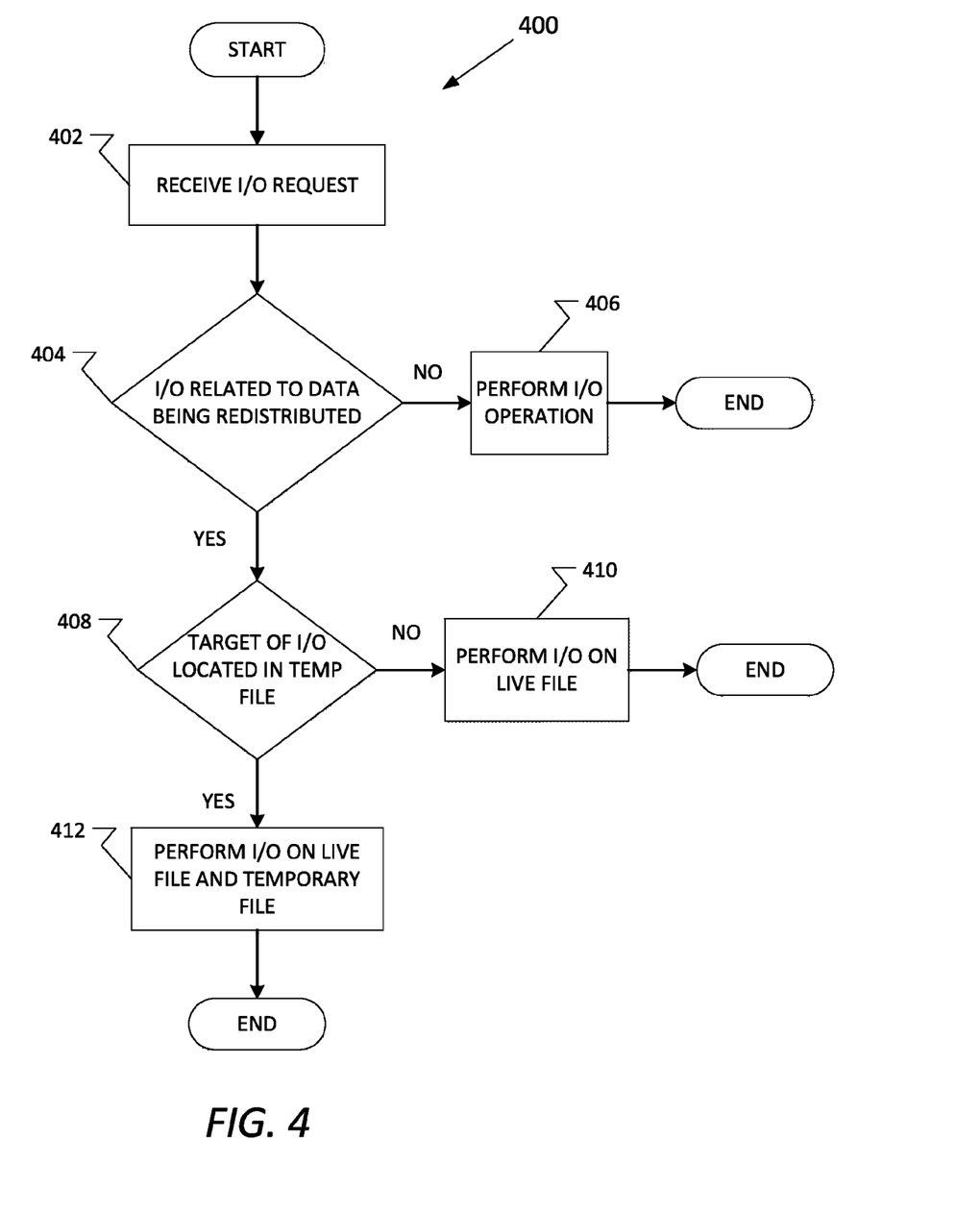
FIG. 4 is a flow diagram illustrating an embodiment of a method for dynamically handling I/O operations during disk redistribution.

FIG. 4 is a flow diagram illustrating an embodiment of a method 400 for dynamically handling I/O operations during disk redistribution. In embodiments, the method 300 may be performed by a database system, such as the database system 100, that may comprises one or more computing devices, such as the computing device described with respect to FIG. 5. In other embodiments, the method 300 may be performed by a standard computing device. Furthermore, the method may be performed in software, hardware, or a combination of both software and hardware.

Flow begins at operation 402, where the method 400 receives a request to perform and I/O operation. In embodiments, the request may be sent by a user or another application or process. An I/O operation may be a request to write data to the database, delete data from the database, create new data on the database, or any other type of operation performed in a database environment that modifies data.

Upon receiving the I/O request, flow continues to decision operation 404 where a determination is made as to whether the I/O request relates to redistributed data. Because the redistributed data may reside in multiple places (e.g., a live database file and a temporary file), the I/O request is not performed as normal if it relates to redistributed data. However, if the I/O request does not relate to redistributed data, flow branches NO to operation 406 where the I/O request is performed on data in the database and the method 400 terminates.

If the I/O request relates to redistributed data, flow branches YES to decision operation 408. At operation 408, a determination is made as to whether the target of the I/O request is located in a temporary file. In embodiments, the target of the request is the data that the I/O request will be performed on. The target may be a file, a table, an individual entry in a table, or any other data commonly stored in a database. Furthermore, the target may be an entire data structure (e.g., a relational table) or a portion of a data structure (e.g., a row from a table) stored in the database. If the target is not located in the temporary file, that is, the target has not yet been copied to the temporary file, flow branches NO to operation 410. At operation 410, the I/O operation is performed on the target located in the live database file. In such circumstances, it may only be necessary to perform the I/O operation on the live database file because the target, while being redistributed data, has not yet been copied into the temporary file. Thus, any changes that may result from the I/O operation will be captured when the target is copied to the temporary file.

If the target, or a portion of the target, resides in the temporary file, flow branches YES to operation 412. At operation 412, the I/O operation is performed on two copies of the target, the copy of the target located in the live database file and the copy of the target located in the temporary file. Because the I/O operation modifies the data, it is necessary to perform the I/O operation on the copy located on the temporary file. This copy will eventually be written to the database and, therefore, to ensure persistence of the I/O operation, the operation is performed on the target located in the temporary file. However, the I/O operation must also be performed on the copy of the target located in the live database file. In embodiments, even though the live database file is purged after completion of the swap described at operation 308 in FIG. 3, capturing the I/O operation in the live database file ensures that any modifications made by the operation persist in case of a failure. For example, in embodiments, the live data files remain present in the database until the completion of the data redistribution. If the data redistribution fails, the live database files are maintained, therefore no information is lost in case of a disk redistribution failure. Thus, the I/O operation is also performed on the copy of the target stored in the live database file to ensure that any modifications persist in case of a failure to complete disk redistribution.

While FIG. 4 describes the method 400 by illustrating a discreet number of operations performed in a particular order, one of skill in the art will appreciate that additional or fewer operations may be employed in further embodiments to perform dynamic disk data redistribution. For example, the two of the operations described with respect to FIG. 4 may be combined into a single operation without departing from the spirit of the embodiments disclosed herein. Furthermore, while the operations of the method 400 are described in a particular order, one of skill in the art will appreciate that the method 400 may be performed without adhering to the particular order described with respect to the embodiment illustrated in FIG. 4.

Figure 5:
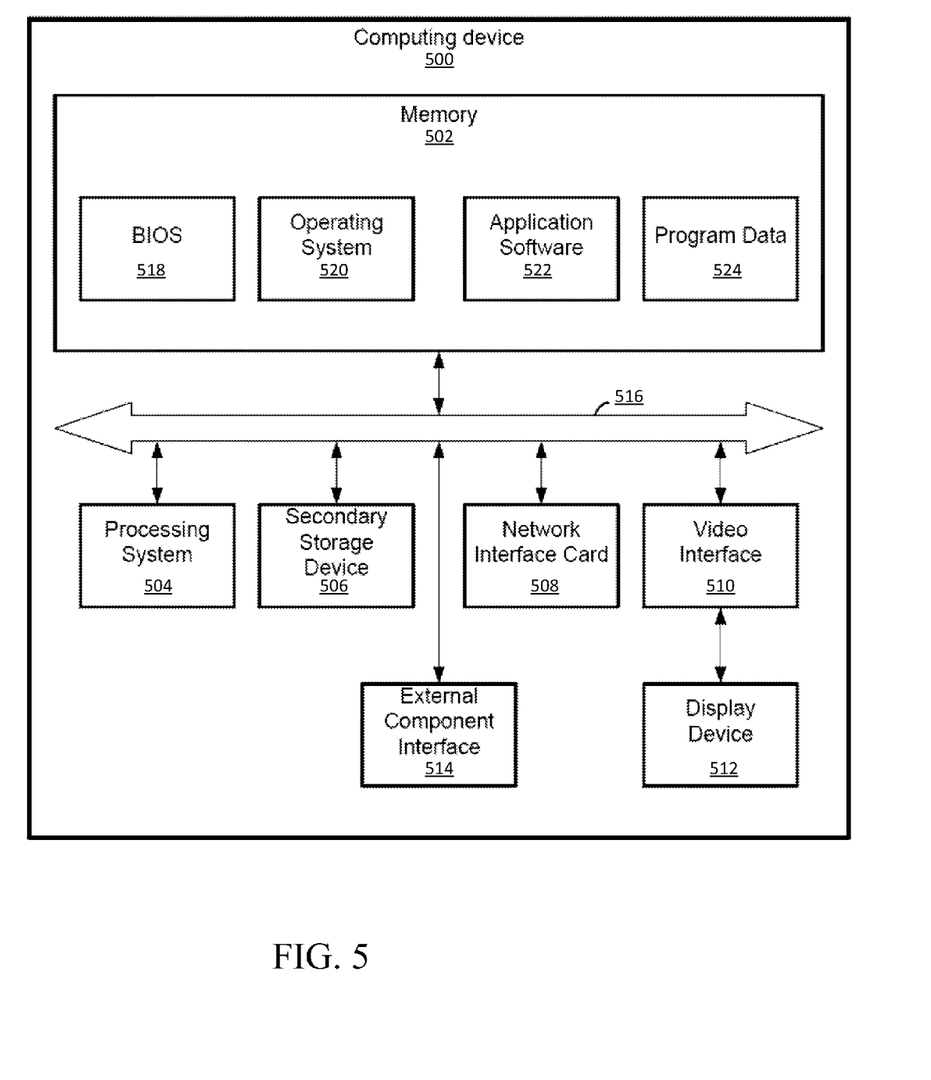
FIG. 5 is a block diagram illustrating example physical details of an electronic computing device, with which aspects of the present disclosure can be implemented.

FIG. 5 is a block diagram illustrating an example computing device 500. In some embodiments, the database system 100 and/or a device with the operating system 110 are implemented as one or more computing devices like the computing device 500. It should be appreciated that in other embodiments, the database system 100 and/or a device with the operating system 110 are implemented using computing devices having hardware components other than those illustrated in the example of FIG. 5.

The term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In the example of FIG. 5, the computing device 500 includes a memory 502, a processing system 504, a secondary storage device 506, a network interface card 508, a video interface 510, a display unit 512, an external component interface 514, and a communication medium 516. The memory 502 includes one or more computer storage media capable of storing data and/or instructions. In different embodiments, the memory 502 is implemented in different ways. For example, the memory 502 can be implemented using various types of computer storage media.

The processing system 504 includes one or more processing units. A processing unit is a physical device or article of manufacture comprising one or more integrated circuits that selectively execute software instructions. In various embodiments, the processing system 504 is implemented in various ways. For example, the processing system 504 can be implemented as one or more processing cores. In another example, the processing system 504 can include one or more separate microprocessors. In yet another example embodiment, the processing system 504 can include an application-specific integrated circuit (ASIC) that provides specific functionality. In yet another example, the processing system 504 provides specific functionality by using an ASIC and by executing computer-executable instructions.

The secondary storage device 506 includes one or more computer storage media. The secondary storage device 506 stores data and software instructions not directly accessible by the processing system 504. In other words, the processing system 504 performs an I/O operation to retrieve data and/or software instructions from the secondary storage device 506. In various embodiments, the secondary storage device 506 includes various types of computer storage media. For example, the secondary storage device 506 can include one or more magnetic disks, magnetic tape drives, optical discs, solid state memory devices, and/or other types of computer storage media.

The network interface card 508 enables the computing device 500 to send data to and receive data from a communication network. In different embodiments, the network interface card 508 is implemented in different ways. For example, the network interface card 508 can be implemented as an Ethernet interface, a token-ring network interface, a fiber optic network interface, a wireless network interface (e.g., WiFi, WiMax, etc.), or another type of network interface.

The video interface 510 enables the computing device 500 to output video information to the display unit 512. The display unit 512 can be various types of devices for displaying video information, such as a cathode-ray tube display, an LCD display panel, a plasma screen display panel, a touch-sensitive display panel, an LED screen, or a projector. The video interface 510 can communicate with the display unit 512 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 514 enables the computing device 500 to communicate with external devices. For example, the external component interface 514 can be a USB interface, a FireWire interface, a serial port interface, a parallel port interface, a PS/2 interface, and/or another type of interface that enables the computing device 500 to communicate with external devices. In various embodiments, the external component interface 514 enables the computing device 500 to communicate with various external components, such as external storage devices, input devices, speakers, modems, media player docks, other computing devices, scanners, digital cameras, and fingerprint readers.

The communications medium 516 facilitates communication among the hardware components of the computing device 500. In the example of FIG. 5, the communications medium 516 facilitates communication among the memory 502, the processing system 504, the secondary storage device 506, the network interface card 508, the video interface 510, and the external component interface 514. The communications medium 516 can be implemented in various ways. For example, the communications medium 516 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518 and an operating system 520. The BIOS 518 includes a set of computer-executable instructions that, when executed by the processing system 504, cause the computing device 500 to boot up. The operating system 520 includes a set of computer-executable instructions that, when executed by the processing system 504, cause the computing device 500 to provide an operating system that coordinates the activities and sharing of resources of the computing device 500. Furthermore, the memory 502 stores application software 522. The application software 522 includes computer-executable instructions, that when executed by the processing system 504, cause the computing device 500 to provide one or more applications. The memory 502 also stores program data 524. The program data 524 is data used by programs that execute on the computing device 500.

Overall, a number of advantages of the methods and systems of the present disclosure exist and are described throughout the disclosure. For instance, the dynamic redistribution of data in a database among physical storage devices allows the database to be evenly distributed across physical disks, thereby evening out read/write bandwidth and failure risks for any single disk and avoiding database unavailability in the process. However, additional advantages exist that may not have been explicitly described herein.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for performing a dynamic disk redistribution while maintaining a user's ability to access to a database, the method comprising:
   initializing a temporary file;
   copying a live database file from a memory device to the temporary file, wherein the temporary file comprises redistributed data;
   swapping the live database file with the temporary file, wherein swapping the live database file with the temporary file comprises distributing data from the temporary file evenly over one or more physical disks that make up the database;
   purging the live database file being copied; and
   wherein the redirection method further includes:
   receiving a next I/O operation during the dynamic disk redistribution;
   determining if the next I/O operation relates to redistributed data;

upon determining that the next I/O operation does not relate to the redistributed data, performing the next I/O operation;
upon determining that the next I/O operation relates to the redistributed data:
determining if a target of the next I/O operation resides in the temporary file:
upon determining that the target does not reside in the temporary file, performing the next I/O operation on the live database file;
upon determining that the next I/O operation relates to the redistributed data, performing the next I/O operation on the temporary file and the live database file.

2. The method of claim 1, wherein the temporary file has all of the physical attributes of the live database file.

3. The method of claim 1, wherein the I/O operation comprises one of:
a write operation;
a create operation; and
a delete operation.

4. The method of claim 1, further comprising temporarily suspending I/O operations when swapping the live database file with the temporary file.

5. A computer storage medium encoding computer executable instructions that, when executed by at least on processor, perform a method of dynamic disk redistribution, the method comprising: receiving a redistribute command; initializing a temporary file;
copying live database file to the temporary file, wherein the temporary file comprises redistributed data;
writing the temporary file to the database, wherein writing the temporary file comprises distributing data, from the temporary file evenly over one or more physical disks that make up a database;
purging the live database file being copied; and
wherein the redirection method further includes:
receiving a next I/O operation during the dynamic disk redistribution;
determining if the next I/O operation relates to redistributed data:
upon determining that the next I/O operation does not relate to the redistributed data, performing the next I/O operation;
upon determining that the next I/O operation relates to the redistributed data:
determining if a target of the next I/O operation resides in the temporary file:
upon determining that the target does not reside in the temporary file, performing the next I/O operation on the live database file;
upon determining that the next I/O operation relates to the redistributed data, performing the next I/O operation on the temporary file and the live database file.

6. The method of claim 5, wherein the I/O operation comprises one of:
a write operation;
a create operation; and
a delete operation.

7. A system for performing a dynamic disk redistribution while maintaining a user's ability to access to a database, the system comprising:
at least one processing unit; and
memory storing computer executable instructions that, when executed by the at least one processing unit, perform a method of:
receiving a redistribute command;
initializing a temporary file;
copying live database file to the temporary file, wherein the temporary file comprises redistributed data;
receiving an I/O operation;
determining if a target of the I/O operation is located in the temporary file;
upon determining that the target of the I/O operation is located in the temporary file, performing the I/O operation on the temporary file and the live database file;
purging the live database file being copied; and
wherein the redirection method further includes:
receiving a next I/O operation during the dynamic disk redistribution;
determining if the next I/O operation relates to redistributed data:
upon determining that the next I/O operation does not relate to the redistributed data, performing the next I/O operation;
upon determining that the next I/O operation relates to the redistributed data:
determining if a target of the next I/O operation resides in the temporary file:
upon determining that the target does not reside in the temporary file, performing the next I/O operation on the live database file;
upon determining that the next I/O operation relates to the redistributed data, performing the next I/O operation on the temporary file and the live database file.

8. The system of claim 7, wherein the I/O operation comprises one of: a write operation; a create operation; and a delete operation.

9. The system of claim 7, wherein the redistributed data comprises a plurality of files.

* * * * *